Feb. 3, 1959     C. L. PEDERSON     2,871,812
RIM RESIZING TOOL
Filed May 7, 1956
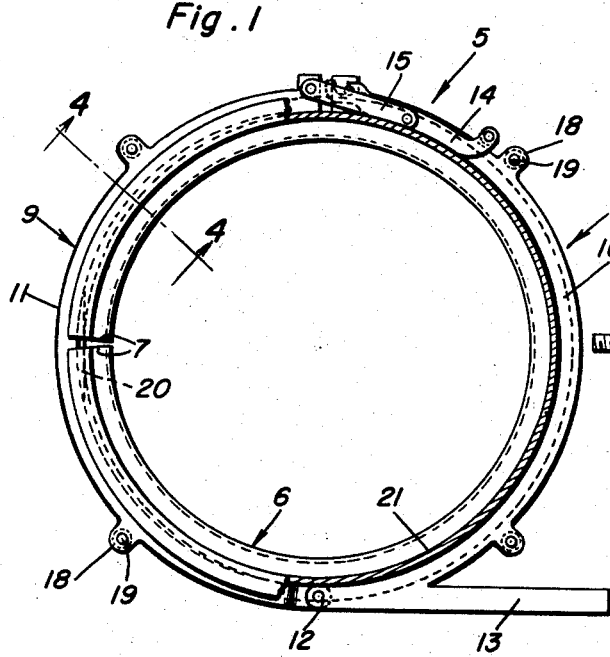
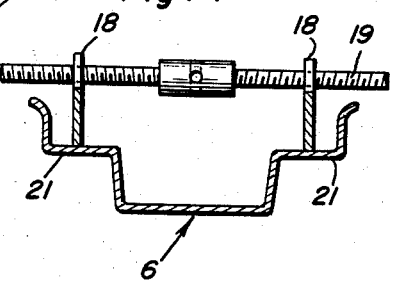
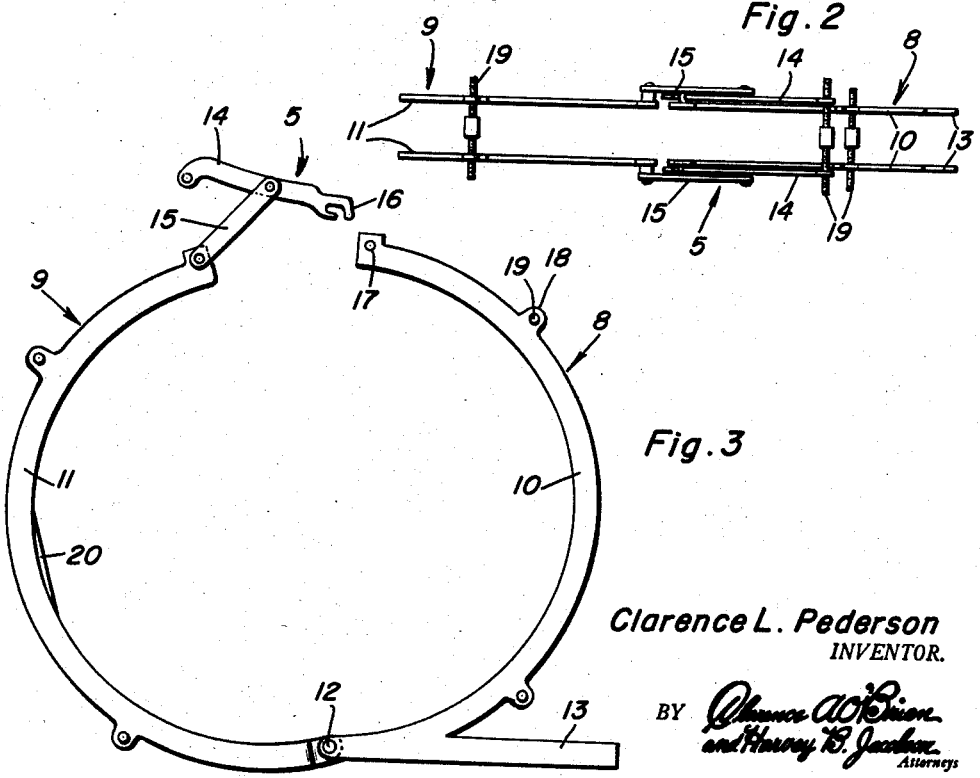
Clarence L. Pederson
INVENTOR.

United States Patent Office 2,871,812
Patented Feb. 3, 1959

2,871,812

RIM RESIZING TOOL

Clarence L. Pederson, Montevideo, Minn.

Application May 7, 1956, Serial No. 583,149

1 Claim. (Cl. 113—99)

The present invention relates to new and useful improvements in rim resizing tools and has for its primary object to provide, in a manner as hereinafter set forth, novel means for expeditiously and with a minimum of effort, abutting the ends, preparatory to welding of the pneumatic tire rims of farm implements, trailers, etc., which are to be reduced in diameter and from which, toward this end, sections have been cut.

Another very important object of the invention is to provide a resizing tool of the aforementioned character which may be readily adjusted for use on rims of different widths.

Other objects of the invention are to provide a rim resizing tool of the character set forth which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view partially in side elevation and partially in vertical section, showing a resizing tool constructed in accordance with the present invention applied to a rim;

Figure 2 is a top plan view of the device;

Figure 3 is a side elevational view of the device, showing the clamp in open position; and Figure 4 is a view in transverse section, taken substantially on the line 4—4 of Figure 1.

Referring now to the drawing in detail, it will be seen that the embodiment of the invention which has been illustrated comprises a substantially circular clamp of suitable metal which is designated generally by reference character 5. The clamp 5 is adapted to encircle and contract the rim to be resized, as indicated at 6. The rim 6 has been previously split by the removal therefrom of a section, leaving the opposed ends 7 to be joined as by welding.

The clamp 5 includes opposed, complemental substantially semi-circular stationary and swingable jaws 8 and 9, respectively. The jaws 8 and 9 comprise pairs of ring sections 10 and 11, respectively, having one end pivotally connected, as at 12. Projecting horizontally from the lower end portions of the ring sections 10 are base members 13 or bars 13 on which the clamp 5 rests and on which the operator may place a foot for securing said clamp in an upright position for use.

The free end portions of the jaws 8 and 9 are detachably connected for compressing or contracting the rim 6 therebetween by means comprising hand levers 14. The hand levers 14 are mounted on the free end portions of the ring sections 11 through the medium of links 15. At one end, the levers 14 terminate in hooks 16 which are engageable with lugs or pins 17 on the free end portions of the ring sections 10 for closing the jaws 8 and 9.

In the embodiment of the invention which has been shown, threaded apertured ears 18 radiate from the peripheries of the rim sections 10 and 11. Turnbuckles 19 (see Fig. 4) are threaded through the ears 18 for adjusting the width of the jaws 8 and 9. Welded or otherwise suitably affixed to the inner deges of the ring sections 11, at intermediate points, are substantially segmental guides 20 for engagement with the ends 7 of the split rim 6.

It is thought that the use of the tool will be readily apparent from a consideration of the foregoing. Briefly, with the clamp 5 in open position as seen in Figure 3 of the drawing, the rim 6 is mounted therein with the ends 7 of said rim engaged with the guides 20. As seen in Figure 4 of the drawing, the ring sections 10 and 11 are engageable with the side portions 21 of the rim 6, which is of the drop center type. The hooks 16 of the levers 14 are then engaged with the pins 17 and said levers are swung in a clockwise direction for closing the jaws 8 and 9, thereby compressing or contracting the split rim 6 and drawing the ends 7 thereof together or substantially so. The levers 14 are swung downwardly past dead center and come to rest on the rim 6. As the rim 6 is compressed or contracted the members 20 guide the ends 7 toward each other and prevent distortion of said rim, maintaining a substantially perfect circle. The rim is now ready to be welded. Of course, to remove the resized rim from the clamp, the levers 14 are swung in a counter-clockwise direction for opening the jaws 8 and 9. Through the medium of the turnbuckles 19 the jaws 8 and 9 of the clamp 5 may be readily widened or narrowed to accommodate rims of different widths. The levers 14 are adjustably connected by one of the turnbuckles 19 for operation in unison.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A rim resizing tool comprising: a substantially circular clamp for the reception of a split rim to be resized, said clamp comprising a pair of opposed, substantially semi-circular stationary and swinging jaws pivotally connected at one end and adapted to receive the rim therebetween, said stationary and swinging jaws including, respectively, pairs of laterally spaced, opposed stationary and swinging ring sections engageable circumferentially with the side portions of the rim, pins on the free end portions of the stationary ring sections, links pivotally mounted on the free end portions of the swinging ring sections, levers pivotally mounted on said links and engageable with said pins for closing the jaws and contracting the rim and bringing the ends thereof into abutting engagement with each other, turnbuckles threadedly connected to the laterally opposed ring sections and to the levers for adjusting said ring sections and said levers toward or away from each other, circumferential guides at intermediate points in the swinging ring sections engageable with the rim for circumferentially aligning the ends thereof as said rim is contracted, and horizontal supporting bars projecting tangentially from said one end of the stationary jaw for receiving thereon a foot of an operator for securing the clamp in an upright position on a supporting surface.

(References on following page)

References Cited in the file of this patent

UNITED STATES PATENTS

| | | |
|---|---|---|
| 889,315 | Kenyon | June 2, 1908 |
| 1,057,110 | Armstrong | Mar. 25, 1913 |
| 1,550,161 | Hamm et al. | Aug. 18, 1925 |
| 2,187,878 | Hill et al. | Jan. 23, 1940 |
| 2,308,340 | Newlon | Jan. 12, 1943 |
| 2,557,202 | Raymond et al. | June 19, 1951 |

FOREIGN PATENTS

| | | |
|---|---|---|
| 457,910 | Canada | July 5, 1949 |